Jan. 2, 1934.  H. W. HEM  1,941,834
WEIGHING SCALE
Filed March 5, 1931
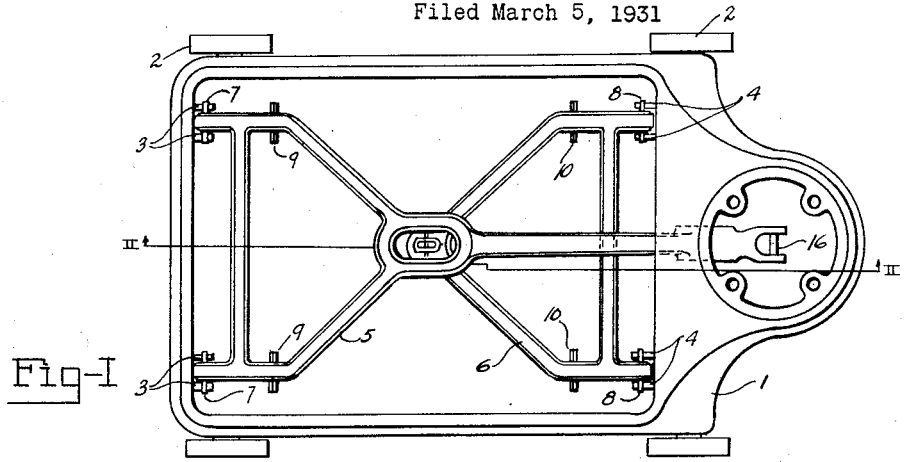
Fig-I
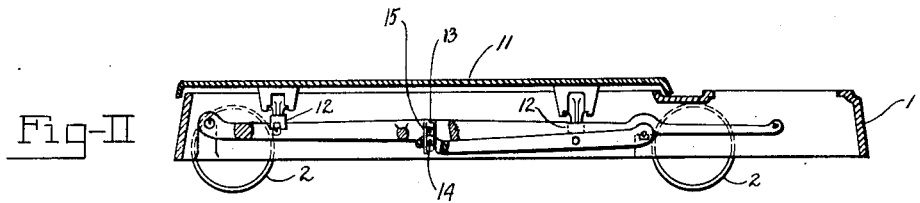
Fig-II
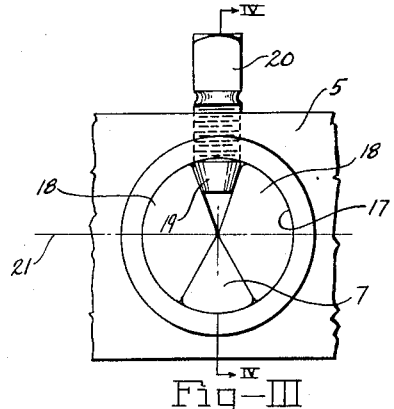
Fig-III
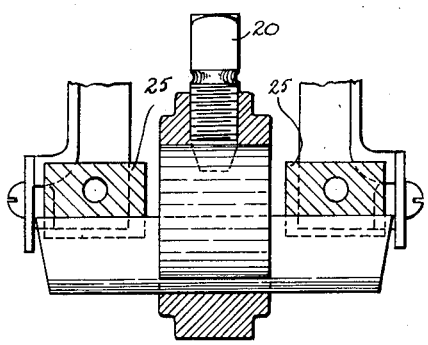
Fig-IV
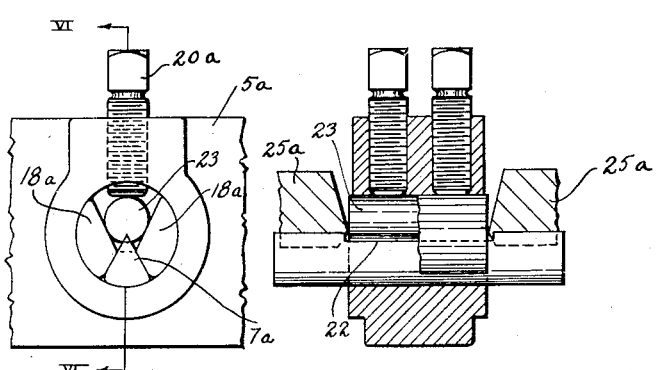
Fig-V     Fig-VI
Halvor W. Hem
INVENTOR.
BY C. O. Marshall
ATTORNEY.

Patented Jan. 2, 1934

1,941,834

UNITED STATES PATENT OFFICE 1,941,834

WEIGHING SCALE

Halvor W. Hem, Toledo, Ohio, assignor to Toledo Scale Manufacturing Company, Toledo, Ohio, a corporation of New Jersey Application March 5, 1931. Serial No. 520,279

5 Claims. (Cl. 308—2)

This invention relates to weighing scales and particularly to the art of fastening and retaining pivots in levers or other scale members. It is essential that pivots in scales be securely fastened, and it is very desirable that they be easily interchangeable and it is also very desirable to construct the pivots in such a manner, that when stationed in accurately bored holes, the knife edges will always be coincident with the axes of such holes and when it becomes necessary to replace one of the pivots on account of breakage, wear, or for any other cause, the owner may perform this operation himself without incurring the expense of a service man's trip from the factory, which might be located at a considerable distance.

The principal object of my invention is, therefore, the provision of means for interchangeably fastening scale pivots in levers or other scale members.

Another object is the provision of means whereby such pivots are fixed in a scale member by means of a plurality of retainers and coacting wedging members.

These and other objects and advantages will be apparent from the following description in which reference is had to the accompanying drawing and in which similar reference numerals designate similar parts throughout the several views.

In the drawing:—

Figure I is a plan view of a portable scale base showing levers embodying my invention.

Figure II is a sectional side elevational view thereof sectioned substantially along the line II—II of Figure I.

Figure III is an enlarged elevational view of a fragment of a scale member showing one form of a pivot embodying my invention.

Figure IV is an enlarged sectional view of the pivot shown in Figure III, the lever being sectioned substantially along the line IV—IV of Figure III and showing the operative relationship of a bearing stirrup.

Figure V is an enlarged fragmentary view of a modified form of a pivot embodying the invention; and Figure VI is a sectional view along the line VI—VI of Figure V and showing the co-operation of a different form of bearing.

Referring to the drawing in detail, the base mechanism which I have selected to illustrate my invention, is fully described and illustrated in United States Patent No. 1,543,768 to H. O. Hem and in this specification, I will describe it only in so far as is necessary to fully disclose my invention.

The base 1, which is preferably a rigid iron casting, is mounted for ease of transportation upon wheels 2 and is provided in its interior with brackets 3 and 4 upon which a platform supporting lever system is mounted. This lever system comprises a long lever 5 and a short lever 6 which are provided with fulcrum pivots 7 and 8 and load pivots 9 and 10 respectively, upon which a platform 11 is resting with its bearing stirrups 12. The two levers 5 and 6 are connected by the center pivots 13 and 14 and the bearing loop 15. The long lever 5 is also provided with a nose pivot 16 which transmits the effect of a load to the counterbalancing and indicating mechanism (not shown). Pivot 7, which we may take as a representative example, is stationed within a circular bore 17 (Figure III). This bore and the bores, in which the pivots 8, 9, 10, 13, 14 and 15 are stationed, must be very accurately machined and in spaced relation with each other. The pivots are of such cross section so that when located in the bores, the knife edges will always lie coincidently with the axis of the holes regardless at what angle to an imaginary vertical line they are stationed. This is due to the fact that the cross section of the pivot is substantially a sector of a circle whose circumference is subsantially equal to the circumference of the circular bore; and the knife edge of the pivot is coincident with the radial point; however, the embodiment of the invention, as shown in Figure III, is calculated so that the axis to the cross section of the pivot will always lie at exactly 90 degrees to the longitudinal axis of the lever. To retain the pivot in predetermined location, two clamping members 18 are provided. Portions of the contour of these members are circular and adapted to contact the inner wall of the bore. Other portions of the contour are so calculated and designed as to substantially grip the angular sides of the pivot and when so engaged, still other faces form an angular opening into which the cone-like end 19 of a locking screw 20 extends. It is obvious that when this locking screw is tightened, the cone-like end, cooperating with the angular faces of the clamping members 18, will urge these to exert a clamping action on the sides of the pivot and hold it invariably in the same position. It is also obvious that this construction, when the bore 17 and the hole in the lever through which the clamping screw 20 is threaded, are properly machined, the axis of the pivot passing through the knife edge will always be at right angles to the pivot line 21 of the lever, as the clamping members 18 grip the pivot with equal pressure on either side.

A modification of my invention is shown in Figures V and VI. The pivot 7a is similar to the pivot 7 in the previous example with the exception that a portion 22 is milled out of the knife edge to clear a metallic cylinder 23 which is placed so that it lies within the angle formed by the faces of the clamping members 18a. The pivot and clamping members are similarly locked by the set screw 20a which is threaded through the lever 5a. The cylindrical member 23, when properly hardened, serves as a thrust for the bearing 25 as can plainly be seen in Figure VI.

It will be readily seen that the embodiment of my invention shown and described is well suited to fulfill the objects primarily stated. It is to be understood, however, that it is susceptible to variation, modification and change within the spirit and scope of the subjoined claims.

Having described my invention, I claim:

1. In a scale, in combination, a lever having a plurality of circular bores accurately machined therein on the longitudinal axis thereof, pivots seated therein, a pair of similar separate clamping members disposed within said bores, one of which is located on each side of said pivot, faces of said members forming Vs and screws having conical points threaded through said lever, and said conical points exerting wedging forces upon said clamping members to revolve them within the bore to clamp said pivots.

2. In a scale, in combination, a lever having round bores therein and means for fixing a plurality of pivots therein, the axes of said pivots being at an angle of ninety degrees to the longitudinal axis of said lever and each of said pivot fixing means comprising a plurality of clamping members lying wholly within said round bores and a wedging member extending in the axis of such pivot for forcing said clamping members into gripping relationship with such pivot.

3. In a scale, in combination, a lever, a circular bore therein, a pivot and means for clamping said pivot in said circular bore, said clamping means comprising a pair of clamping members lying within said bore, faces of said clamping members contacting said pivot and other faces forming a V, and means for forcing said clamping members into gripping engagement with said pivot, said means comprising a cylinder member disposed within the V formed by faces of the clamping members and a screw threaded through an aperture in a portion of said lever.

4. In a scale, in combination, a lever, a circular bore therein, a pivot and means for clamping said pivot lying in said circular bore, said clamping means comprising a pair of clamping members, faces of said clamping members contacting said pivot and other faces forming a V, and means for forcing said clamping members into gripping engagement with said pivot, said means comprising a cylindrical member disposed within the V formed by faces of the clamping members and a screw threaded through an aperture in a portion of said lever, and said cylindrical member lying with a recess of said pivot.

5. In a scale, in combination, a lever, a circular bore therein, a pivot and means for clamping said pivot in said circular bore, said clamping means comprising a pair of clamping members lying within and having curved surfaces engaging the interior surface of said circular bore, faces of said clamping members lying against the face of said pivot and other faces forming a V, and wedging means within said V for forcing said clamping members into gripping engagement with said pivot.

HALVOR W. HEM.